(12) United States Patent
Robinson

(10) Patent No.: US 9,132,808 B2
(45) Date of Patent: Sep. 15, 2015

(54) BRAKE UNIT

(75) Inventor: Peter Bryce Robinson, Parkinson (AU)

(73) Assignee: Hy-Performance Fluid Power Pty Ltd, Browns Plains, Queensland (AU)

( * ) Notice: Subject to any disclaimer, the term of this patent is extended or adjusted under 35 U.S.C. 154(b) by 1056 days.

(21) Appl. No.: 12/991,075

(22) PCT Filed: Apr. 14, 2009

(86) PCT No.: PCT/AU2009/000606
§ 371 (c)(1),
(2), (4) Date: Nov. 4, 2010

(87) PCT Pub. No.: WO2009/140718
PCT Pub. Date: Nov. 26, 2009

(65) Prior Publication Data
US 2011/0088991 A1    Apr. 21, 2011

(30) Foreign Application Priority Data

May 19, 2008    (AU) ............................ 2008902461

(51) Int. Cl.
*B60W 10/18* (2012.01)
*B60T 1/06* (2006.01)
*F16D 55/40* (2006.01)
*F16D 121/02* (2012.01)

(52) U.S. Cl.
CPC ............ *B60T 1/062* (2013.01); *F16D 55/40* (2013.01); *F16D 2121/02* (2013.01); *Y10T 29/49716* (2015.01)

(58) Field of Classification Search
CPC ...... B60T 1/062; F16D 55/40; F16D 2121/02
USPC ............ 192/219.4, 221, 70.16, 110 S, 112, 192/30 W; 74/606 R, 607; 29/401.1
See application file for complete search history.

(56) References Cited

U.S. PATENT DOCUMENTS

| | | | |
|---|---|---|---|
| 2,878,903 A | 3/1959 | Ordorica | |
| 3,046,813 A | 7/1962 | Bixby | |

(Continued)

FOREIGN PATENT DOCUMENTS

| | | | |
|---|---|---|---|
| DE | 3015028 A1 | 10/1980 | |
| DE | 3738586 A1 | 5/1989 | |
| GB | 2117465 A | 10/1983 | |
| JP | H09222139 A | 8/1997 | |

OTHER PUBLICATIONS

European Search Report; Mailed Nov. 19, 2012 for the corresponding EP Application No. 09749326.6.

(Continued)

*Primary Examiner* — David J Hlavka
(74) *Attorney, Agent, or Firm* — Mendelsohn, Drucker & Dunleavy, P.C.

(57) ABSTRACT

A vehicle brake unit is provided for use with a drive train having a drive train subassembly. The brake unit comprises a brake unit housing for enclosing a braking mechanism, the braking mechanism arranged to act on a power shaft configured for operatively connecting the output drive shaft of the drive train subassembly with a further drive shaft, in order to transfer power therebetween. The brake unit housing is arranged for mounting directly to a housing of the drive train subassembly. In one embodiment of the invention, the brake unit housing replaces the rear tail housing of a four-wheel drive transfer case.

8 Claims, 9 Drawing Sheets

(56) References Cited

U.S. PATENT DOCUMENTS

| | | | |
|---|---|---|---|
| 3,095,758 A | | 7/1963 | Bixby |
| 3,505,904 A | | 4/1970 | Williams, Jr. |
| 4,057,297 A | * | 11/1977 | Beck et al. .................. 303/71 |
| 4,304,317 A | * | 12/1981 | Vanzant et al. .............. 180/247 |
| 4,422,349 A | * | 12/1983 | Matsumoto et al. ......... 475/116 |
| 4,577,524 A | | 3/1986 | Richards et al. |
| 4,860,612 A | * | 8/1989 | Dick et al. .................. 74/665 H |
| 5,368,135 A | | 11/1994 | Sallee |
| 7,753,173 B2 | * | 7/2010 | Gratzer et al. .............. 184/6.12 |

OTHER PUBLICATIONS

Notification of Reasons for Refusal; Mailed Mar. 12, 2013 for the corresponding JP Application No. 2011-509815.

Australian Office Action; Mailed Aug. 12, 2012 for corresponding AU Application No. 2009250324.

International Preliminary Report on Patentability; Mailed Dec. 2, 2010 for corresponding PCT Application No. PCT/AU2009/000606.

Brink, J. "Review: All Pro Off-Road's Disc Parking Brake," Dec. 2000, Retrieved from the Internet on Jan. 14, 2014 from http://www.4x4wire.com/toyota/reviews/parking_brake/.

* cited by examiner

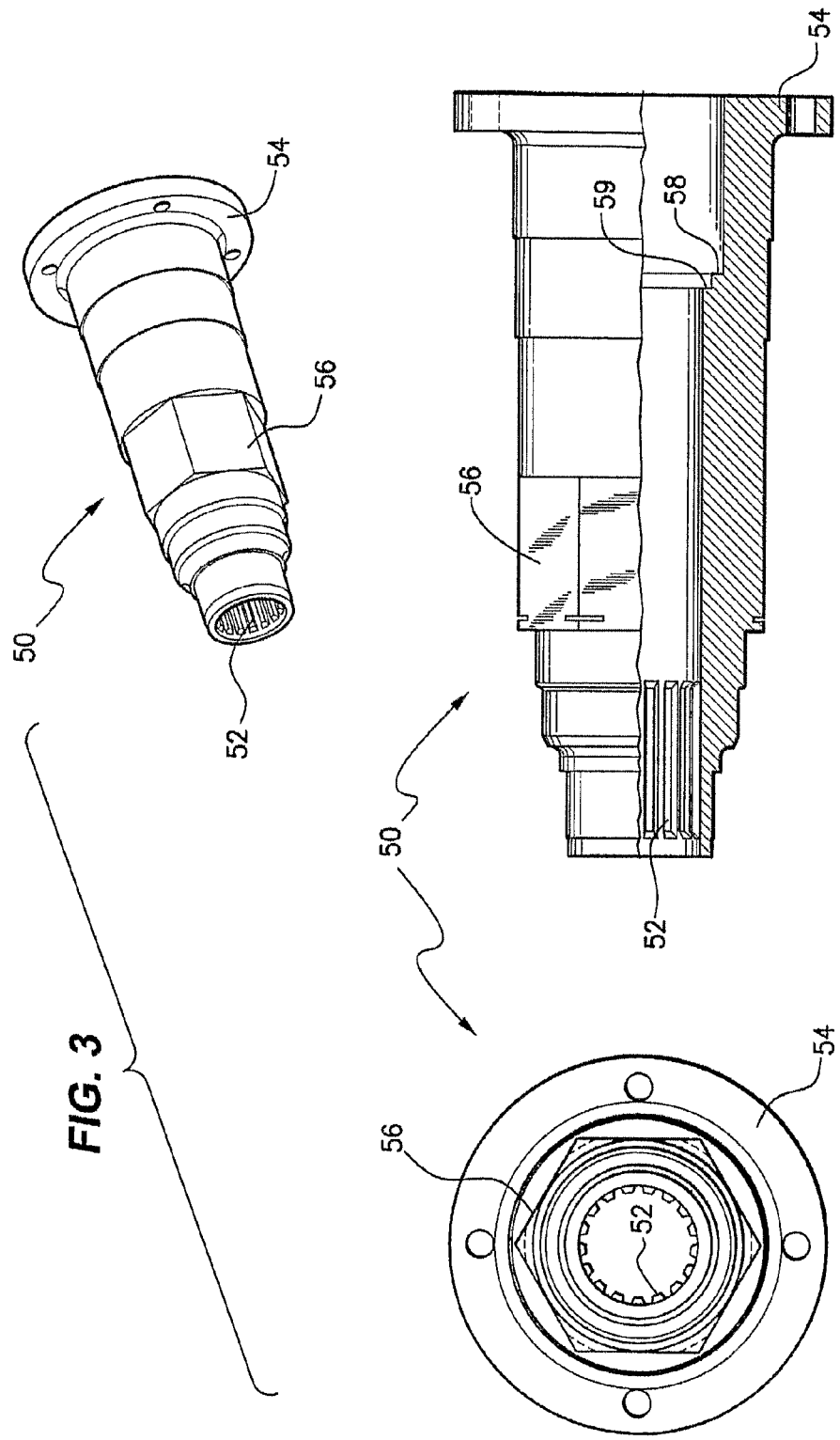

BRAKE UNIT

TECHNICAL FIELD

The invention relates to a brake unit. More particularly, in one aspect, the invention relates to a vehicle brake unit that can serve as a parking brake and/or a safety brake for use in physically demanding environments.

According to further aspects, the invention relates to a drive train subassembly, a method of retrofitting a brake unit to a vehicle, and a kit of parts for retrofitting a brake unit to a vehicle.

BACKGROUND

In this specification, where a document, act or item of knowledge is referred to or discussed, this reference or discussion is not an admission that the document, act or item of knowledge or any combination thereof was at the priority date part of common general knowledge, or known to be relevant to an attempt to solve any problem with which this specification is concerned.

Various different vehicle parking brake arrangements have been proposed in the past. A vehicle handbrake system (emergency or parking brake), for example, is supplementary to the vehicle's primary service hydraulic brake system. Systems of this sort conventionally feature a cable (usually adjustable for length) directly connected to the brake mechanism on one end and to some type of ratchet-engaged lever that can be actuated by the driver at the other end. On vehicles with automatic transmissions, selection by the driver of the 'park' position may be accompanied by activation of a parking pawl in the transmission.

Large vehicles are often fitted with power-operated or servo-assisted handbrake mechanisms. When releasing the handbrake, the same mechanism can also be used to provide assistance to the driver in disengaging the ratchet.

A more recently developed system is the electric parking brake, using an electric motor to operate the emergency brake cable, or a computer-controlled motor actuating the brake callipers.

Generally, such service or parking brake systems operate on the rear vehicle wheels (in the case of drum or disc brakes), or on the rear axle stubs (in the case of vehicles with disc brakes). However, there are disadvantages to the provision of such brake systems at or near the wheels or axle ends.

In demanding environments, such as industrial and off-road applications, such mechanisms are relatively exposed to the aggressive conditions below the vehicle (such as rocks, dust and other loose matter, and undulating terrain), and this can lead to significant maintenance and reliability problems.

Some alternative approaches have been proposed in the prior art.

U.S. Pat. No. 6,318,535 discloses a brake unit operating on the driving pinion of a vehicle differential transmission, with a mechanical configuration designed to avoid passing the braking torque to the differential transmission housing.

U.S. Pat. No. 5,673,776 discloses a parking brake system and a differential lock system, wherein operation of the brake also activates the differential lock. The two systems normally operate independently, but the invention ensures that when the vehicle is parked it cannot roll either in a straight line or (by virtue of the differential lock) in an arcuate path.

U.S. Pat. No. 5,687,611 discloses a parking brake for use with a power shift transmission of a forklift truck, employing a brake band wound around the brake drum of the output gear of a transmission input assembly, which can be tightened to effect the braking action.

Vehicle braking units are of course commercially available for a wide variety of applications. These include multiple disc brakes, such as through-shaft brakes, posi-torque winch brakes, pressure override brakes, and wheel mount brakes. Actuation of such units can be by a variety of means, including spring operation, hydraulic operation, cable operation, etc.

Aspects of the invention described below set out to provide a novel brake unit for use in potentially damaging physical environments.

SUMMARY OF THE INVENTION

According to a first aspect, there is provided a vehicle brake unit for use with a drive train having a drive train subassembly, the brake unit including:
  a housing for enclosing a braking mechanism therein, the braking mechanism configured for operative engagement with an output drive shaft of the drive train subassembly; and
  a power shaft arranged for connecting the drive train subassembly output drive shaft with a further drive shaft for transferring power therebetween,
  wherein said housing is configured for mounting directly to a housing of the drive train subassembly.

The power shaft is thus a connecting shaft element adapted to:
  engage with the drive train subassembly;
  engage with the further drive shaft; and
  interact with the brake mechanism of the braking unit.

The further drive shaft may drive one or more vehicle wheels, and the braking mechanism is configured to act on the power shaft. The power shaft may include a splined surface or an outer surface otherwise shaped to engage with the braking mechanism.

In another embodiment, the brake unit is mounted in place of a transfer case tail housing, the brake unit having a face configured to replicate the mating face of the transfer case tail housing.

The power shaft may be adapted at one end for connection with an end part of the subassembly output drive shaft, and at an opposite end for connection with the further drive shaft.

According to a further embodiment the brake unit includes a retaining means (such as for example a bolt element or similar) for fixedly retaining the power shaft to the drive train subassembly output drive shaft.

In another embodiment the power shaft has an axial bore, and said retaining means is a threaded bolt configured to fit coaxially within said bore and to engage with a complementary threaded portion of the subassembly output drive shaft.

In a further embodiment the brake unit and the drive train subassembly are configured for mutually independent lubrication.

The brake unit may be provided with a seal means for isolating the interior of the brake unit from that of the drive train subassembly so as to substantially prevent cross contamination. As an example, the seal means may be arranged to cooperate with the power shaft to substantially inhibit lubricant from transferring between the mechanism of the brake unit and that of the drive train subassembly. In accordance with this arrangement, the brake unit may comprise an indicator device for indicating whether lubricant is passing, or has passed, the seal means, thereby providing warning of potential cross contamination.

The drive train assembly generally comprises a four wheel drive transfer case unit.

According to a second aspect, there is provided a vehicle drive train assembly including:
- a transfer case;
- an enclosed brake unit mounted directly to the housing of the transfer case;
- a power shaft configured for operatively connecting an output drive shaft of the transfer case and a further drive shaft, for transferring power therebetween;
- wherein the brake mechanism of said brake unit is arranged to act on said power shaft.

In embodiment the brake unit comprises a face configured to replicate a mating face of a transfer case tail housing of said transfer case.

Various embodiments in accordance with the second aspect may incorporate embodiments of the shaft element described above in relation to the first aspect. Similarly, embodiments of the brake unit described in relation to the first aspect may also be adopted to realise a range of embodiments of the second aspect.

According to a third aspect, there is provided a method of retrofitting a disc brake unit to a selected vehicle drive train subassembly including:
- providing a disc brake unit housing portion specially sized and shaped for the selected subassembly;
- removing a tail housing from the subassembly main casing;
- mounting the disc brake unit housing portion to the subassembly main casing;
- fitting a power shaft to provide interconnection between a subassembly output drive shaft and a further drive shaft;
- arranging the disc brake unit so as to interact with the power shaft.

In one embodiment the method further comprises the step of applying a retaining means to the power shaft so as to fixedly engage the power shaft with the subassembly output drive shaft.

In another embodiment the method further comprises the step of shortening a drive shaft in the vehicle drive train to accommodate the longitudinal dimension of the brake unit.

According to another embodiment of the method the tail housing is the rear tail housing and the further drive shaft is the vehicle rear tailshaft.

In any of the embodiments of the method of the third aspect, the selected vehicle drive train subassembly may comprise a four-wheel drive transfer case.

According to a fourth aspect, there is provided a vehicle transfer case including a vehicle brake unit according to any one of the embodiments of the first aspect.

According to a fifth aspect, there is provided a vehicle comprising a vehicle brake unit according to any one of the embodiments of the first aspect.

According to a sixth aspect, there is provided a kit of parts for retrofitting a disc brake unit to a selected vehicle drive train subassembly, the kit including:
- a disc brake unit housing portion specially sized and shaped for the selected subassembly;
- a power shaft specially sized and shaped for cooperation with the output drive shaft of the selected subassembly, for cooperation with the input shaft to the vehicle tailshaft, and for interaction with the disc brake unit.

In one embodiment the kit further includes a retaining means sized and shaped to fixedly engage the power shaft to the output drive shaft of the selected subassembly. The power shaft may comprise an axial bore, the retaining means being a threaded bolt sized and shaped to fit coaxially within the bore and to engage with a complementary threaded portion of the subassembly output shaft.

With respect to any of the embodiments of the above described aspects, the brake unit may comprise a single disc brake unit or a multiple disc brake unit. Furthermore, the disc brake unit may comprise a spring-activated, hydraulic release disc brake unit.

The disc brake unit may be an original engineering manufacturer (OEM) brake unit, and the replacement brake unit housing, or part thereof, can thus provide a direct replacement for the subassembly tail housing and the housing, or a part thereof, of the OEM brake unit.

In another embodiment, the disc brake unit may include a housing including:
- (a) a pressure plate portion;
- (b) a spring plate portion; and
- (c) a cover portion for housing at least one braking disc, wherein the disc brake unit housing portion to be mounted to the subassembly main casing is provided by the disc brake unit cover portion.

The disc brake unit may be further configured for emergency manual release by way of a manually-activated valve element.

Further aspects and features of the invention will be evident from the description of an embodiment of the invention which follows below.

BRIEF DESCRIPTION OF THE DRAWINGS

Aspects of the invention will now be further explained, by example only, with reference to the accompanying drawings, in which:

FIG. 3 shows a power shaft for use with the braking unit in accordance with the invention;

DETAILED DESCRIPTION

Figure 1:
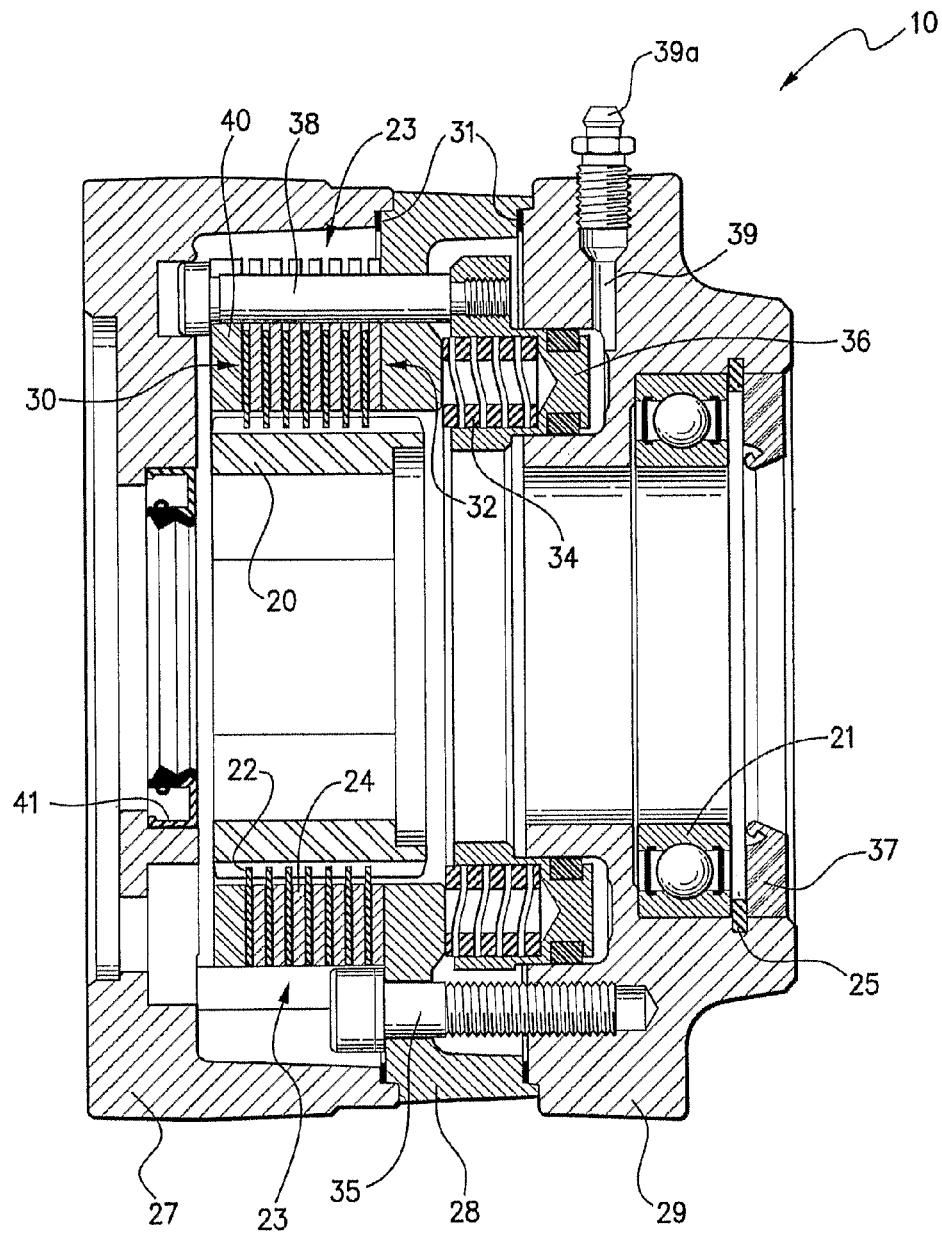
FIG. 1 shows, in longitudinal cross section, a prior art multiple disc braking device.

FIG. 1 illustrates one type of prior art braking device 10 capable of functioning as a parking/safety brake. This unit is a spring-applied/hydraulic release device.

Device 10 includes a rotational collet element 20 that extends through a plurality of co-axially aligned rotor and stator plates 22 and 24. Collet element 20 cooperates with the complementary faces of a shaft (not shown in FIG. 1) which has a first end adapted for connection to a drive shaft, and a second end adapted for connection to the output from a transfer case such as a gearbox or automatic transmission. The rotor plates 22 are adapted to rotate in concert with collet element 20 and thus the shaft, while the stator plates 24 are fixedly held in position, and thus prevented from rotating with the shaft. Plates 22 and 24 are enclosed within a housing.

Plates 22 and 24 of device 10 are arranged in a stack 23 having a first axial end 30 positioned opposite a second axial end 32. A spring assembly 34 comprising a plurality of springs is positioned at the second axial end 32 of stack 23. Axial shoulder bolts 38 are provided for transferring force from a piston 36, engaged by the spring assembly 34, to a release plate 40 at the first axial end 30 of stack 23 as shown. Spring assembly 34 thus provides a spring load for biasing the rotor and stator plates 22, 24 together to provide the parking brake action. When the brake is engaged, plates 22 and 24 are compressed between spring assembly 34 and the release plate such that friction between the plates prevents collet element 20 and hence the shaft from freely rotating.

The brake is disengaged by activation of piston 36 by way of introducing hydraulic oil pressure into the gallery 39 (by way of feed line not shown in FIG. 1). The resulting movement of axial shoulder bolts 38 acts on release plate 40. Thus, when hydraulic pressure is applied to piston 36, it provides a force that overcomes the bias of spring assembly 34, moving parking brake release plate 40 away from the remainder of the plates 22 and 24. With the spring load removed from the plate stack 23, plates 22 and 24 are no longer compressed together and the brake is released.

A bleed nipple 39a connected to gallery 39 is provided at the point on the unit to be mounted uppermost in use.

The housing of braking device 10 comprises a cover part 27, a spring plate part 28, and a pressure plate part 29. Hydraulic feed connects to pressure plate part 29, and four cap screws 35 hold spring plate part 28 and pressure plate part 29 securely together. Four further cap screws (not shown) hold pressure plate part 28 and cover part 27 securely together. Gaskets 31 are provided between the housing parts. Braking device also includes a parallel ball bearing 21 held in place in pressure plate part 29 by snap ring 25. Oil seals 37 and 38 are provided in pressure plate part 29 and cover part 27 respectively.

Figure 2:
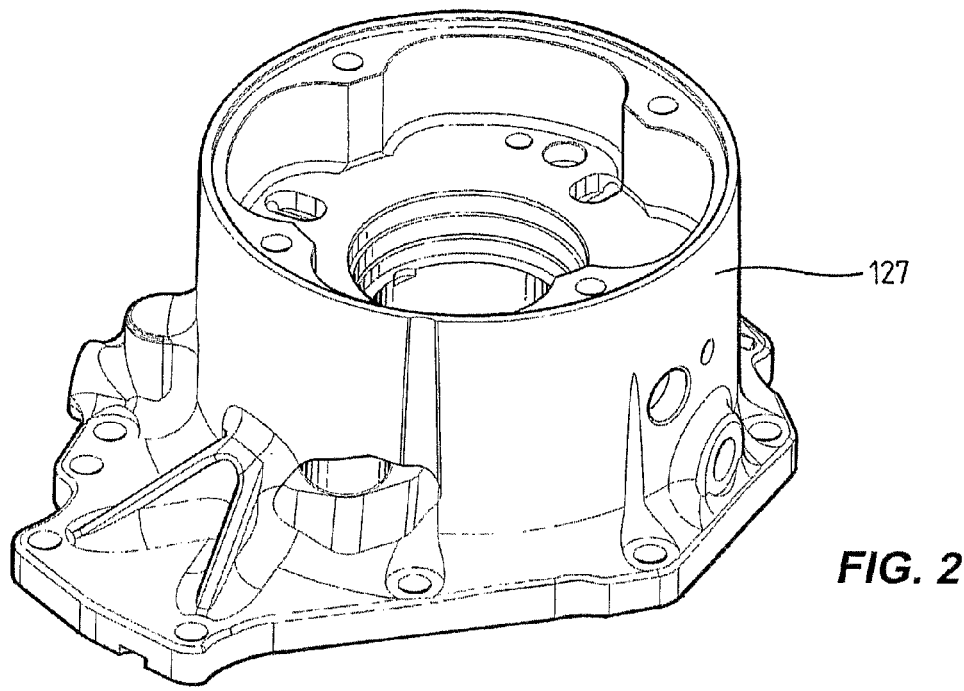
FIGS. 2 and 2A show a replacement housing part for use in a braking unit according to one embodiment of the invention.
Figure 2A:
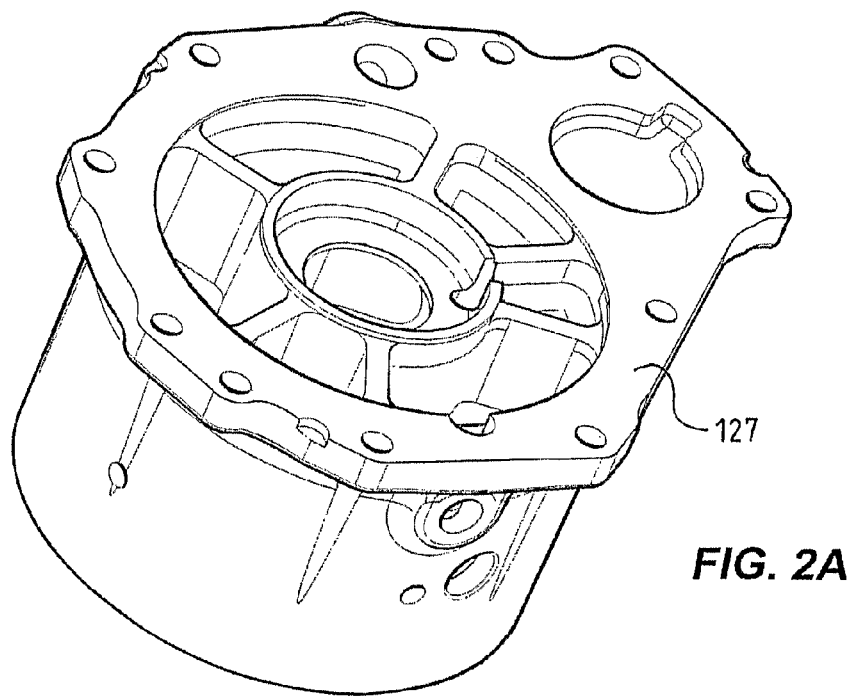

FIGS. 2 and 2A show a replacement housing part 127 for the braking device, designed and manufactured to replace cover part 27 and, at the same time, to replace a vehicle transfer case rear tail housing, in this case for a Toyota Landcruiser (see below), destined for use in aggressive mine site environments. All of the remaining components shown in FIG. 1 and described above remain unchanged, to provide a modified braking unit 110.

With reference to FIGS. 2-8, there is shown one embodiment of a vehicle braking unit 110 specifically designed and arranged, for the instance shown, to work with a Toyota Landcruiser drive train having a drive train subassembly (not shown). The vehicle brake unit 110 comprises the housing 127 for enclosing the braking device 10 therein. The braking device 10 is arranged to be operatively associated with an output drive shaft (not shown) of the drive train subassembly. The brake unit 110 further comprises a power shaft 50 arranged for operatively connecting the drive train with a further drive shaft for transferring power therebetween. The housing 127 is arranged for mounting directly to a housing of the drive train subassembly.

As shown in FIG. 3, the custom-made power shaft 50 provides the interconnection between the output drive shaft 76 of the vehicle transfer case (see below) and the vehicle rear tailshaft (the drive shaft to the rear axle), while interacting with the braking function of the braking unit 110. Power shaft 50 is generally of hollow cylindrical form, with a first splined end 52 designed and arranged to cooperate with the rear output drive shaft of the vehicle transfer case, and a second flange end 54 designed to be bolted to the complementary flange of the Toyota Landcruiser rear tailshaft. An external hex portion 56 is provided to engage with the inner face of the collet element 20 of the braking device.

Figure 4:
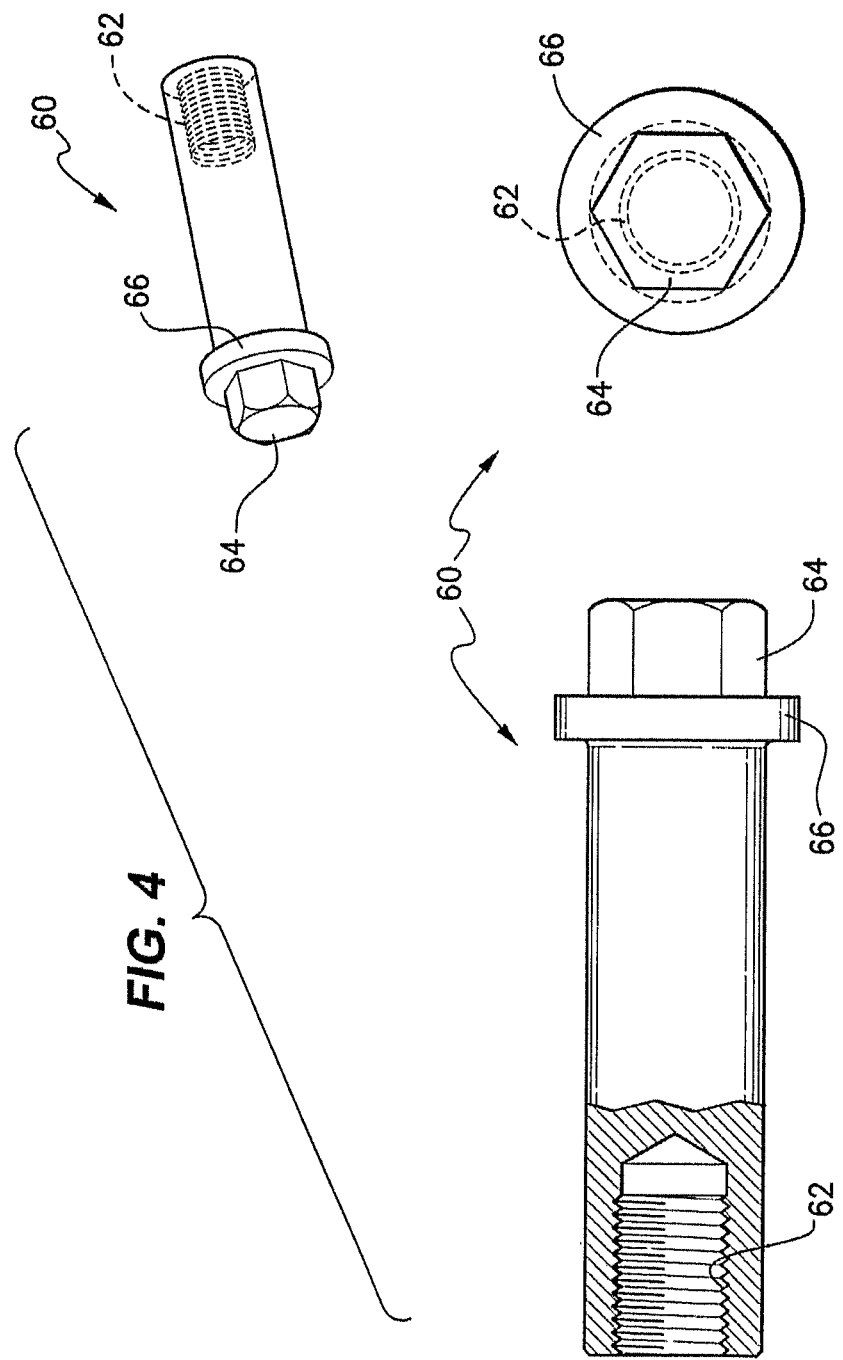
FIG. 4 shows a bolt for use with the power shaft of FIG. 3.

As shown in FIG. 4, a female threaded bolt 60 provides a secure retention between the output drive shaft 76 of the vehicle transfer case and the power shaft 50. Bolt 60 is cylindrical in form, and features an internally threaded closed bore 62 at a first end and a hex bolt head 64 at a second end as shown. A flange portion 66 is provided adjacent head 64, sized and positioned to cooperate with internal shoulder portion 58 of power shaft 50 (FIG. 3).

Figure 5:
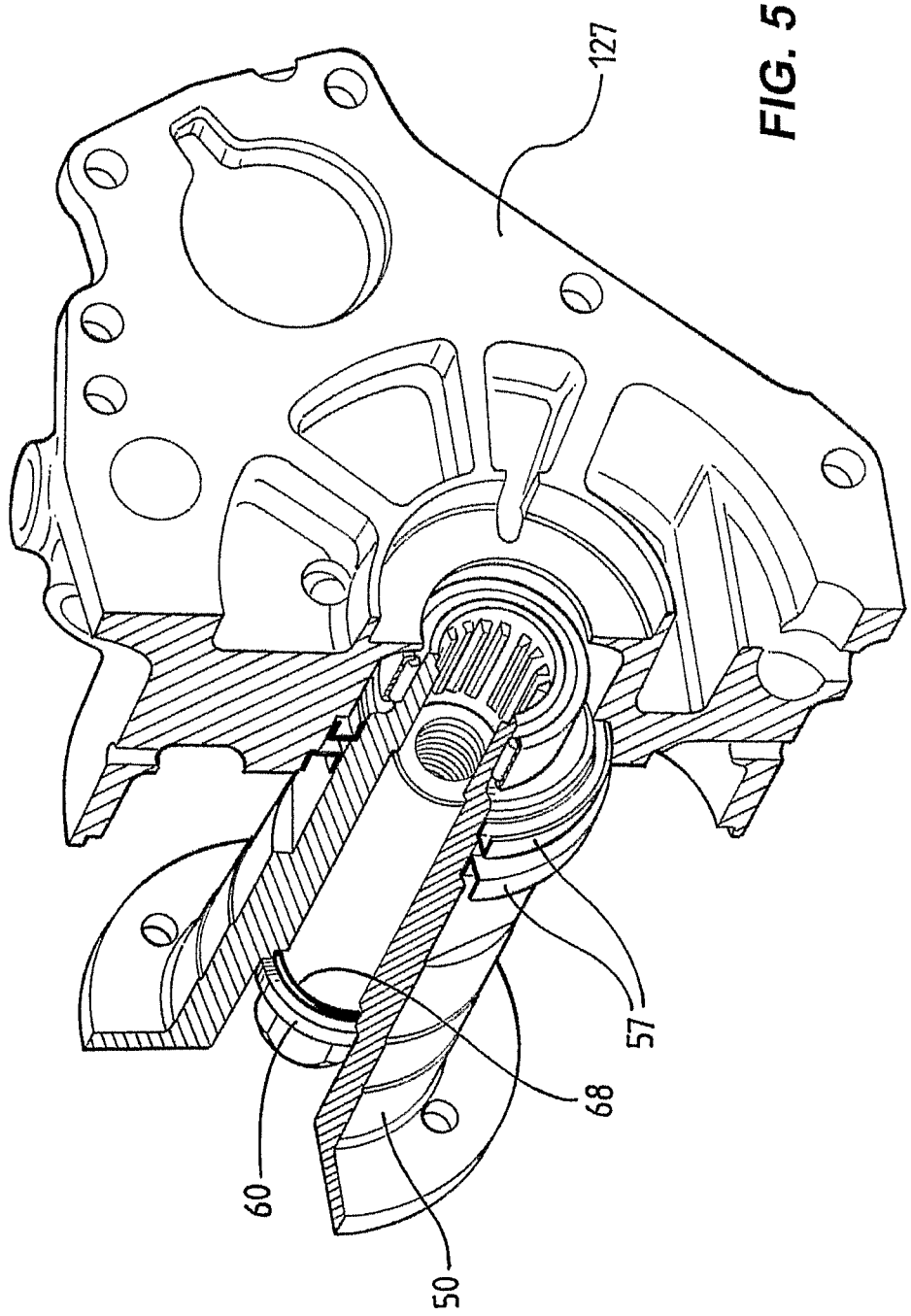
FIGS. 5 and 5A show cutaway 3-dimensional diagrams of the assembly of the power shaft and bolt of FIGS. 3 and 4; and, FIGS. 6-8 illustrate the conversion of a gearbox and transfer case vehicle subassembly.
Figure 5A:
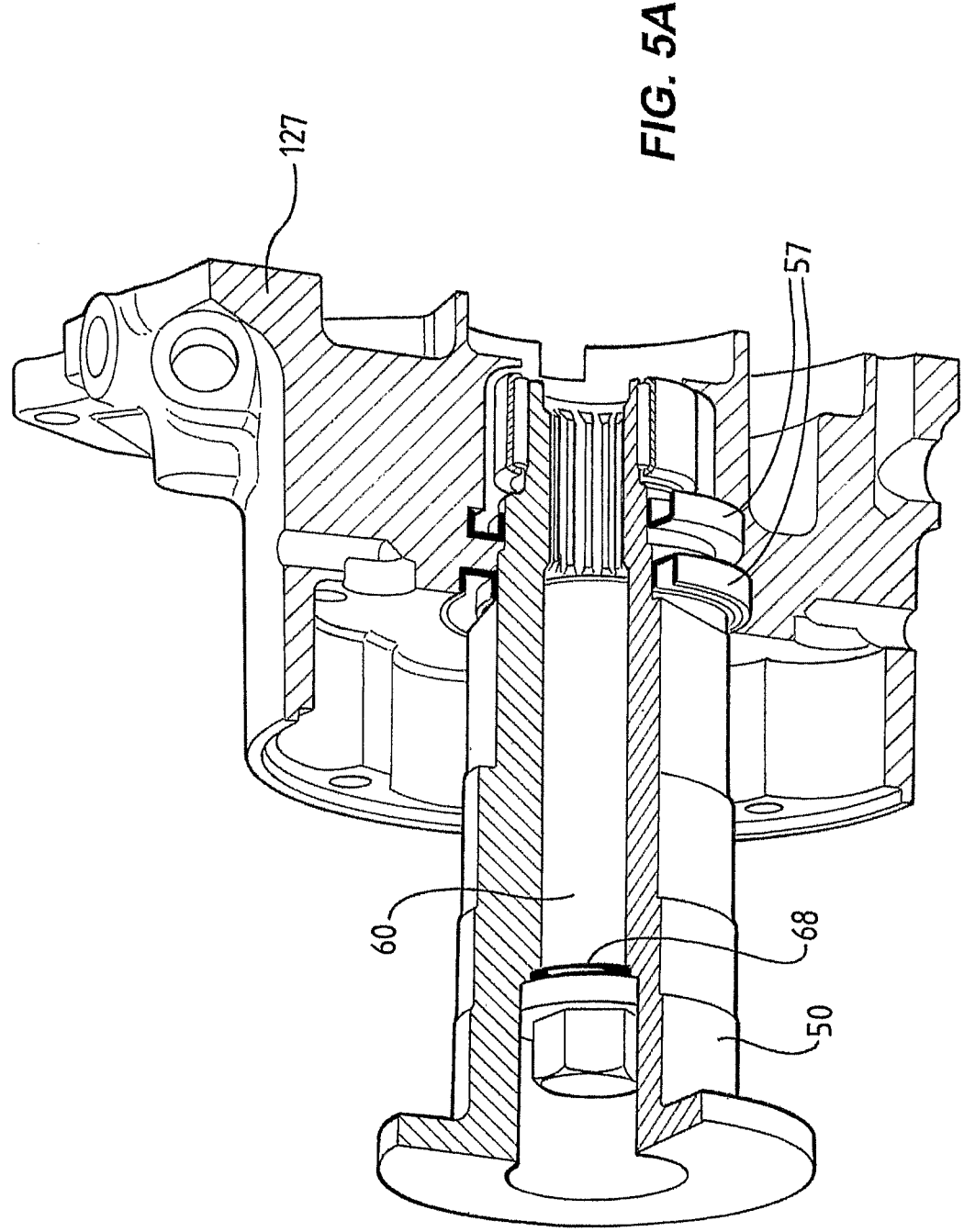

As shown in FIGS. 5 and 5A, first end of power shaft 50 is received into the bore of replacement brake unit housing part 127, with oil seals 57 also fitted within the bore.

Bolt 60 is fitted with o-ring 68 and received within the bore of power shaft 50 from the flange end 54, such that flange portion 66 abuts annular shoulder portion 58, with o-ring 68 seated in annular shoulder portion 59 as shown. The female thread end fits over the male threaded end of the output drive shaft 76 from the vehicle transfer case, and can be bolted thereto by rotation of head 64.

Figure 6:
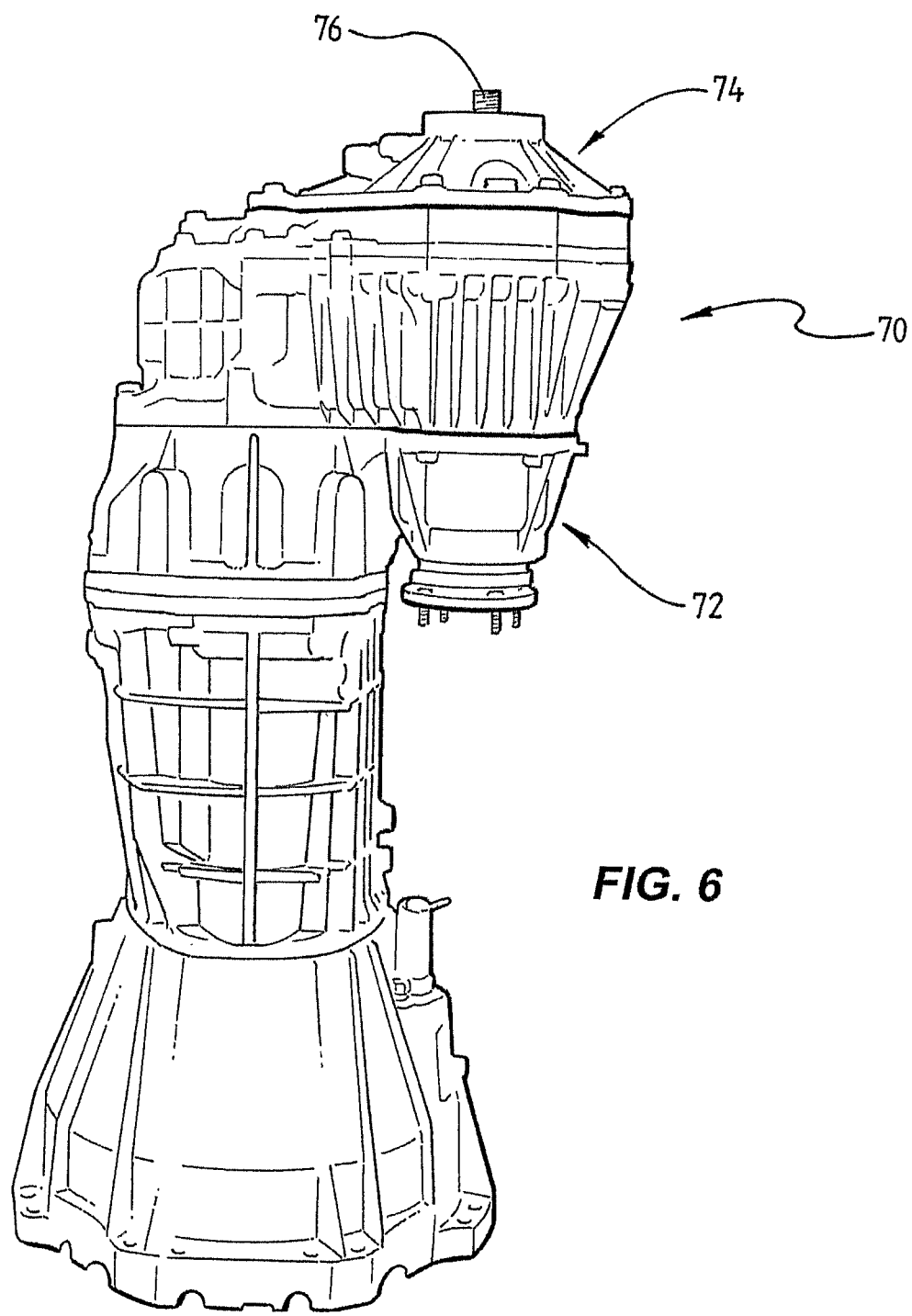
Figure 7:
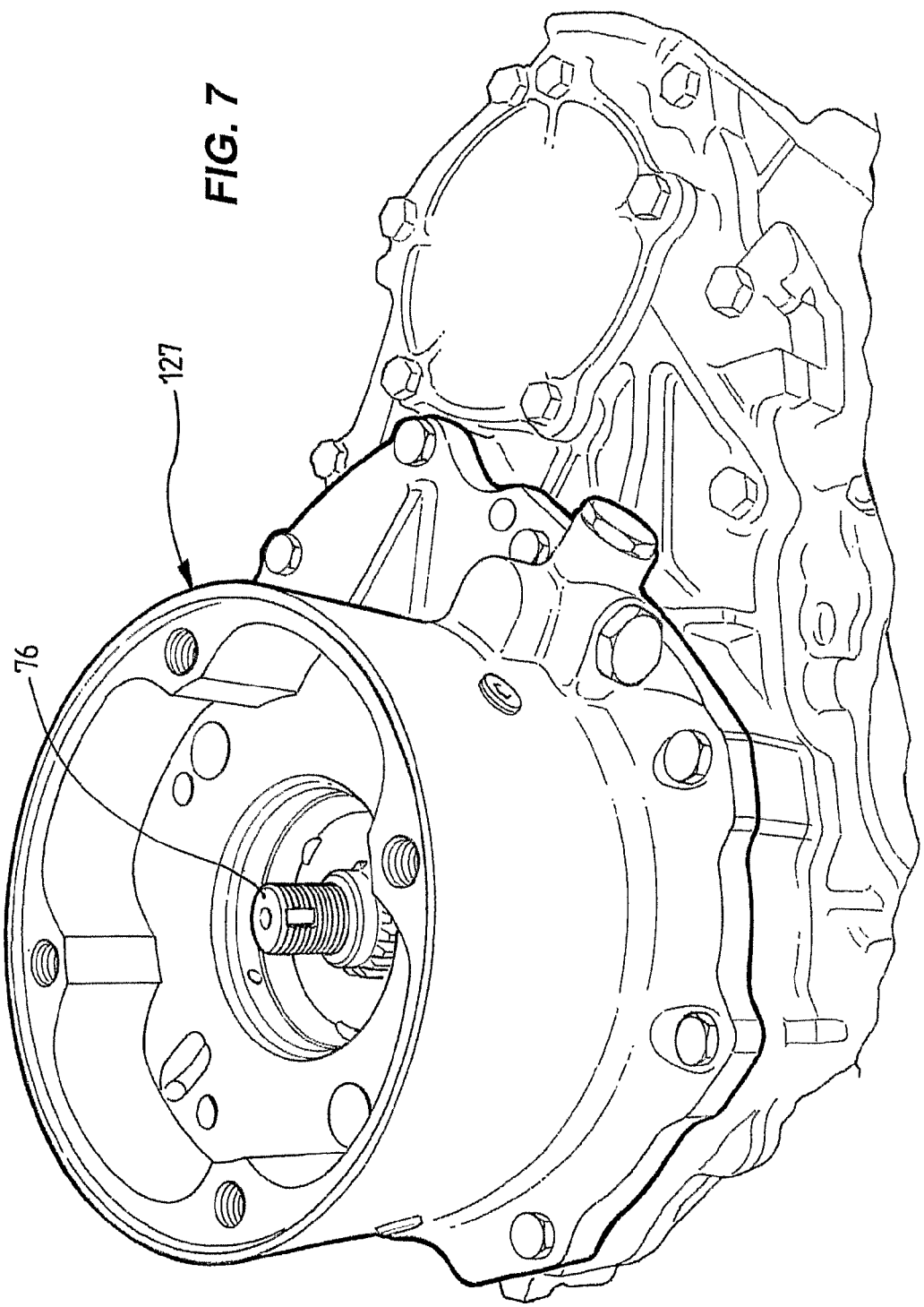
Figure 8:
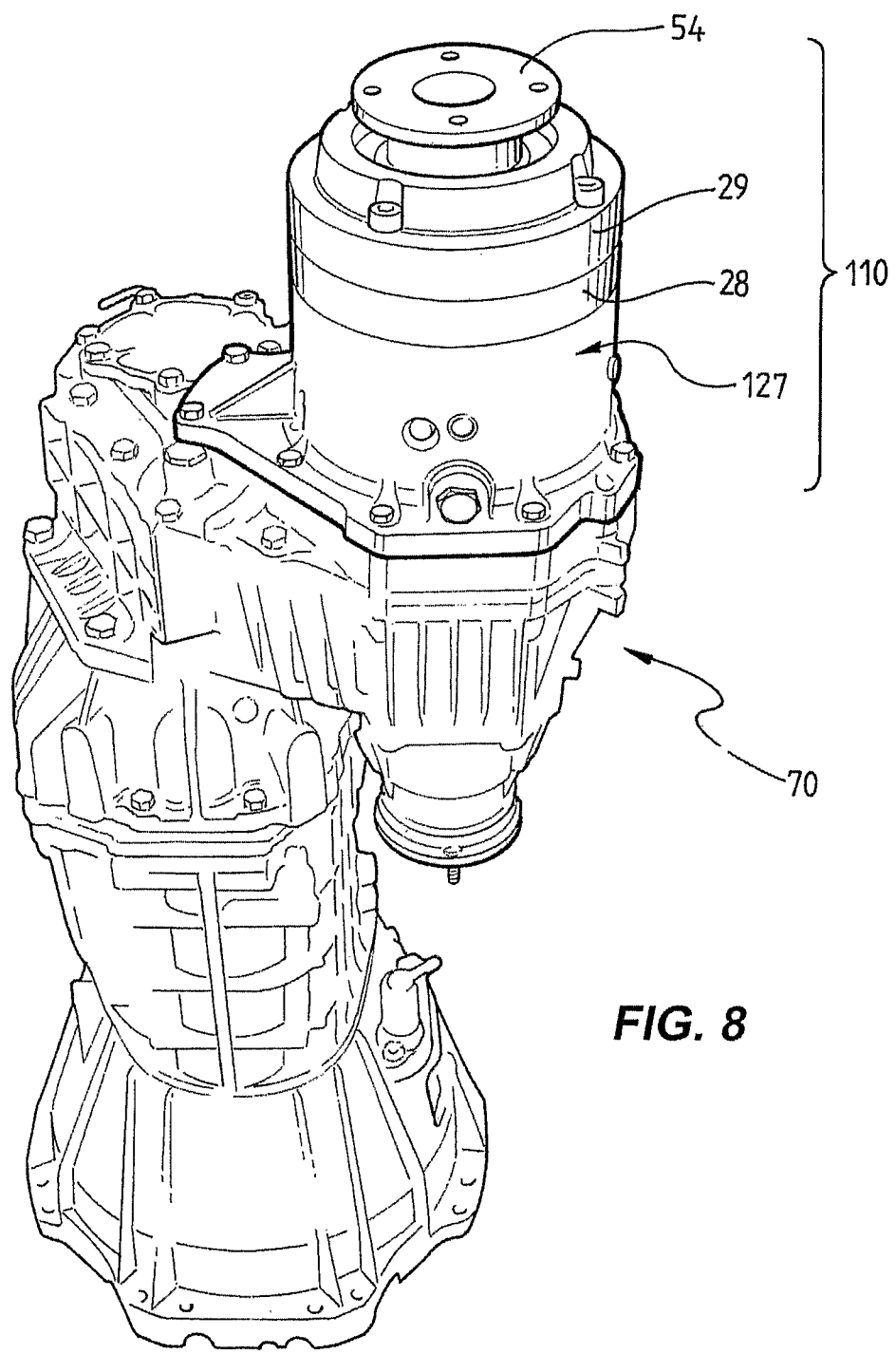

The process of retrofitting the braking device of the invention is illustrated in FIGS. 6-8.

FIG. 6 shows a standard original engineering manufacturer (OEM) Toyota Landcruiser gearbox and transfer case assembly 70 having a front 72 and rear 74 tail housing. Rear output drive shaft 76 can be seen projecting from the rear tail housing 74 of the transfer case assembly 70.

Retro-fitting the embodiment of the brake unit 110 described herein to the Toyota Landcruiser gear box and transfer case assembly 70 is performed as follows. Rear tail housing 74 is unbolted and removed, and replaced with housing part 127 (FIG. 7), with bolt holes sized and spaced to mount securely to the transfer case. The mating surface of part 127 replicates identically the mating surface of tail housing 74. The remaining parts of the braking device 110 illustrated in FIG. 1 (save for, of course, cover part 27), as well as power shaft 50, are then assembled in place. Power shaft 50 is then bolted to output drive shaft 76 by way of female threaded bolt 60.

FIG. 8 shows the entire modified brake unit 110 in place, with flange 54 ready for bolting to a like flange of the vehicle tailshaft.

Finally, the gearbox and transfer case subassembly is mounted in place and the drive train attached to the tailshafts. It will be appreciated from a comparison of FIGS. 6 and 8 that the modified transfer case extends further than the unmodified assembly, and it is therefore necessary to have the rear drive shaft shortened accordingly, in this case by 145 mm.

Braking unit 110 is oil filled for corrosion resistance of internal parts. Although mounted to the transfer case, braking unit 110 does not share oil with the transfer case, to eliminate the risk of cross contamination. The unit may include a seal leakage indicator port, to provide clear indication if oil is passing any of the seals.

Replacement housing part 127 is manufactured from T7 billet aluminium and is anodised after machining to protect against external corrosion. In addition, the outer surfaces of original housing parts 28 and 29 are remachined and electro-zinc plated for corrosion protection. Further, power shaft 50 is electro-zinc plated for corrosion protection.

The system as implemented and tested on a Toyota Landcruiser vehicle is activated by a dash-mounted emergency stop button, and the braking device is also configured to act as the vehicle parking brake by operation of the standard Toyota parking brake lever. The test vehicle system performed extremely well. The installed brake unit was found to fully release at 23.6 bar, the system pressure used being around 68 bar. The system has an under-bonnet hydraulic power unit dedicated to brake release. A dash-mounted system pressure gauge continuously monitors the brake system pressure for viewing by the vehicle driver. Also incorporated into the design are failsafe hydraulic solenoid cartridge valves and a nitrogen-charged accumulator, all mounted in an under-bonnet manifold unit. Further, the system is provided with an easy release means using manually operable valves for vehicles that have been immobilised through total electrical failure.

Further, as many interlocks can be provided in the braking system as may be required by specific requirements or regulations of the particular working environment.

The embodiment of the brake unit 110 described above and illustrated in FIGS. 2-8 is designed specifically for the Toyota Landcruiser. However the skilled reader will understand that the brake unit 110 can similarly be arranged and applied to the drive train of any vehicle or any machine; such as for example, civilian and military versions of the popular Hummer four wheel drive vehicle manufactured by General Motors Corporation. The braking unit 110 can be fitted in place of a transfer case rear or front tail housing, or in place of the drive housing part of any other appropriate drive train subassembly (such as a rear gearbox). In the case of the Toyota Landcruiser, the transfer case tail housing is chosen because, although it is still an underbody component, it is the highest point in this vehicle's drive train, and thus the least vulnerable to damage, in comparison with systems such as axle mounted brakes. Moreover, and in comparison with other braking solutions, the brake unit 110 allows that, in the event of unremediable brake lock, the front and rear drive shafts can be uncoupled or removed, and the vehicle then towed away without the wheels skidding.

The word 'comprising' and forms of the word 'comprising', as used in this description and in the claims that follow, do not limit the invention claimed to exclude any variants or additions. Modifications and improvements to the all aspects of the invention described will be readily apparent to those skilled in the art. Such modifications and improvements are intended to be within the scope of all embodiments of the invention described.

The invention claimed is:

1. A method of retrofitting a disc brake unit to a selected vehicle drive train subassembly, the subassembly including a subassembly output drive shaft, a subassembly main casing and a tail housing, the method comprising the steps of:
   providing the disc brake unit with a housing portion specially sized and shaped for the selected subassembly, the disc brake unit housing portion having a first face configured to replicate a mating face of said tail housing;
   removing said tail housing from the subassembly main casing;
   mounting the disc brake unit housing portion to the subassembly main casing by way of said first face;
   providing a power shaft designed and arranged to cooperate with said subassembly output drive shaft;
   fitting said power shaft to provide interconnection between said subassembly output drive shaft and a further drive shaft; and
   arranging the disc brake unit so as to interact with said power shaft.

2. A method according to claim 1, further comprising the step of applying a retaining means to said power shaft so as to fixedly engage the power shaft with the subassembly output drive shaft.

3. A method according to claim 1, further comprising the step of shortening the subassembly output drive shaft in the vehicle drive train to accommodate the longitudinal dimension of the brake unit.

4. A method according to claim 1, wherein the selected vehicle drive train subassembly is a four-wheel drive transfer case.

5. A method according to claim 1, wherein the tail housing is the rear tail housing and said further drive shaft is the vehicle rear tailshaft.

6. A method according to claim 1, wherein the disc brake unit is a multiple disc brake unit.

7. A method according to claim 1, wherein the disc brake unit is a spring-activated, hydraulic release disc brake unit.

8. A method according to claim 1, wherein the disc brake unit includes a housing including:
   (a) a pressure plate portion;
   (b) a spring plate portion; and
   (c) a cover portion for housing at least one braking disc,
   wherein the disc brake unit housing portion to be mounted to the subassembly main casing is provided by the cover portion.

* * * * *